No. 767,028. PATENTED AUG. 9, 1904.
P. K. WOOD.
MOTOR AND PUMP.
APPLICATION FILED JULY 2, 1900.
NO MODEL. 3 SHEETS—SHEET 3.
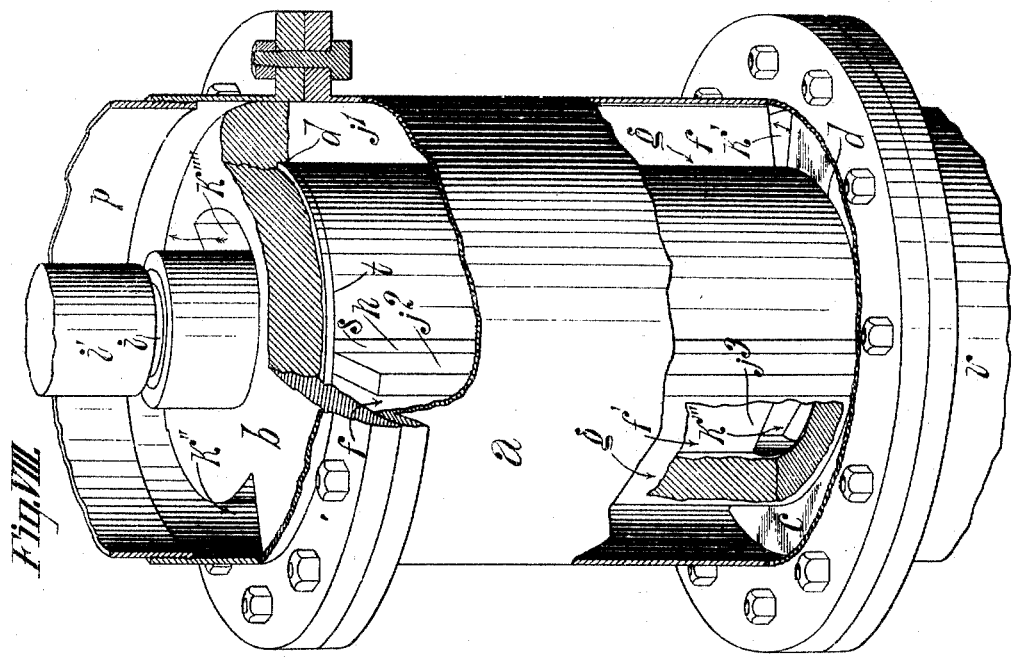
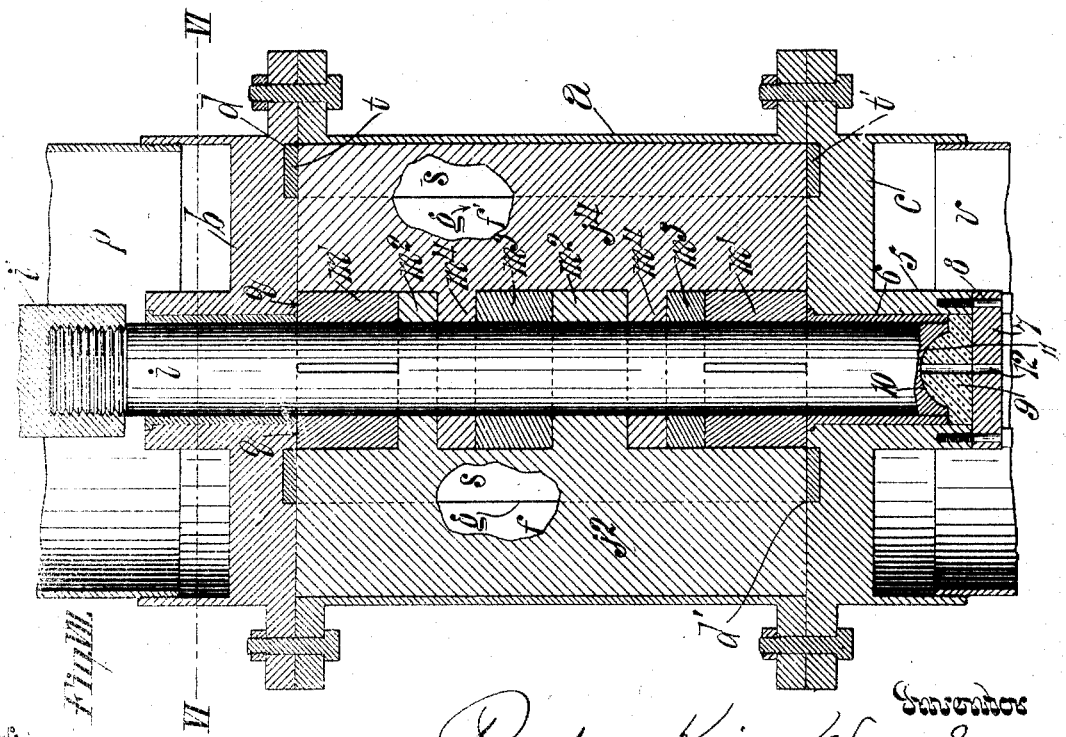

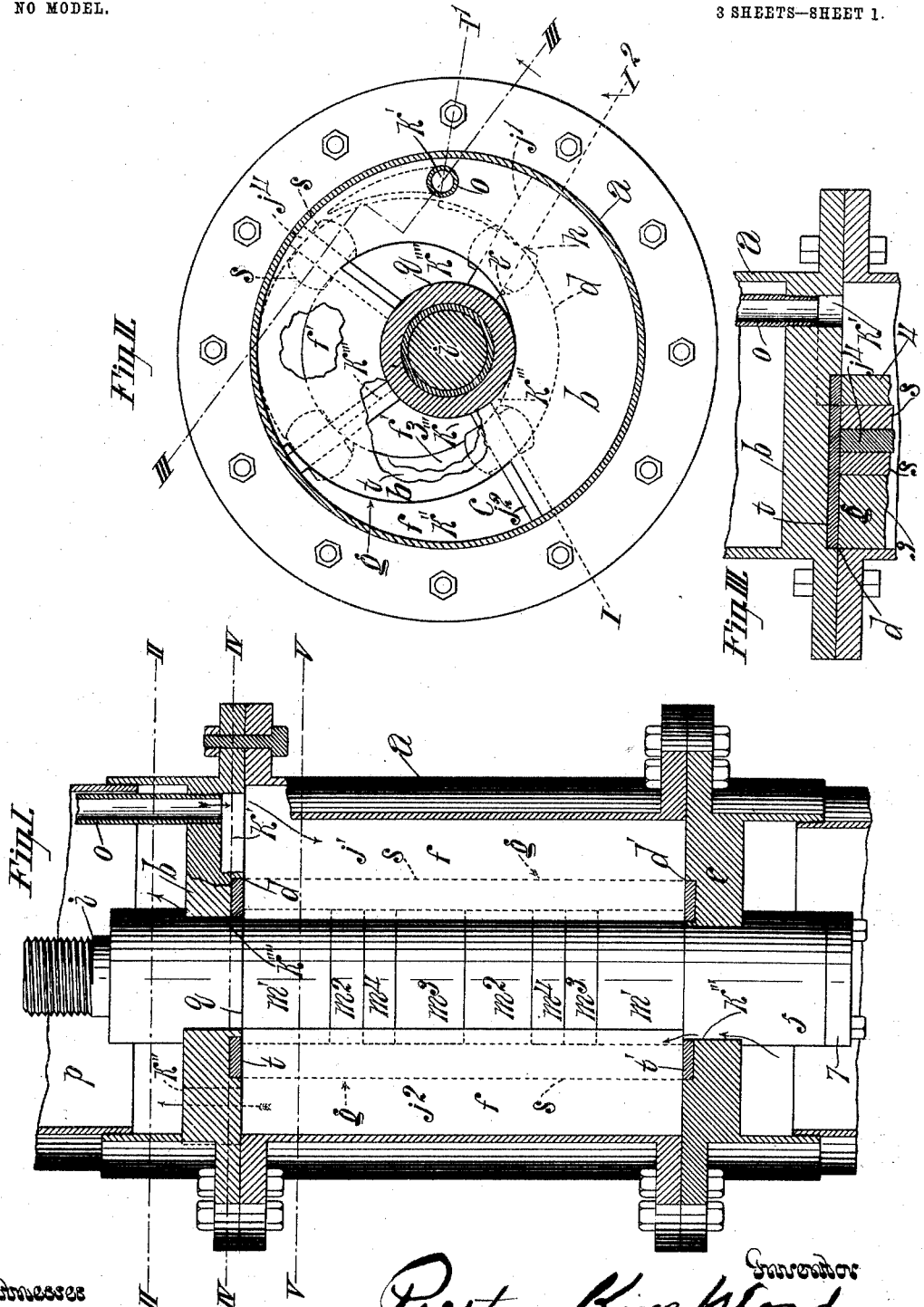

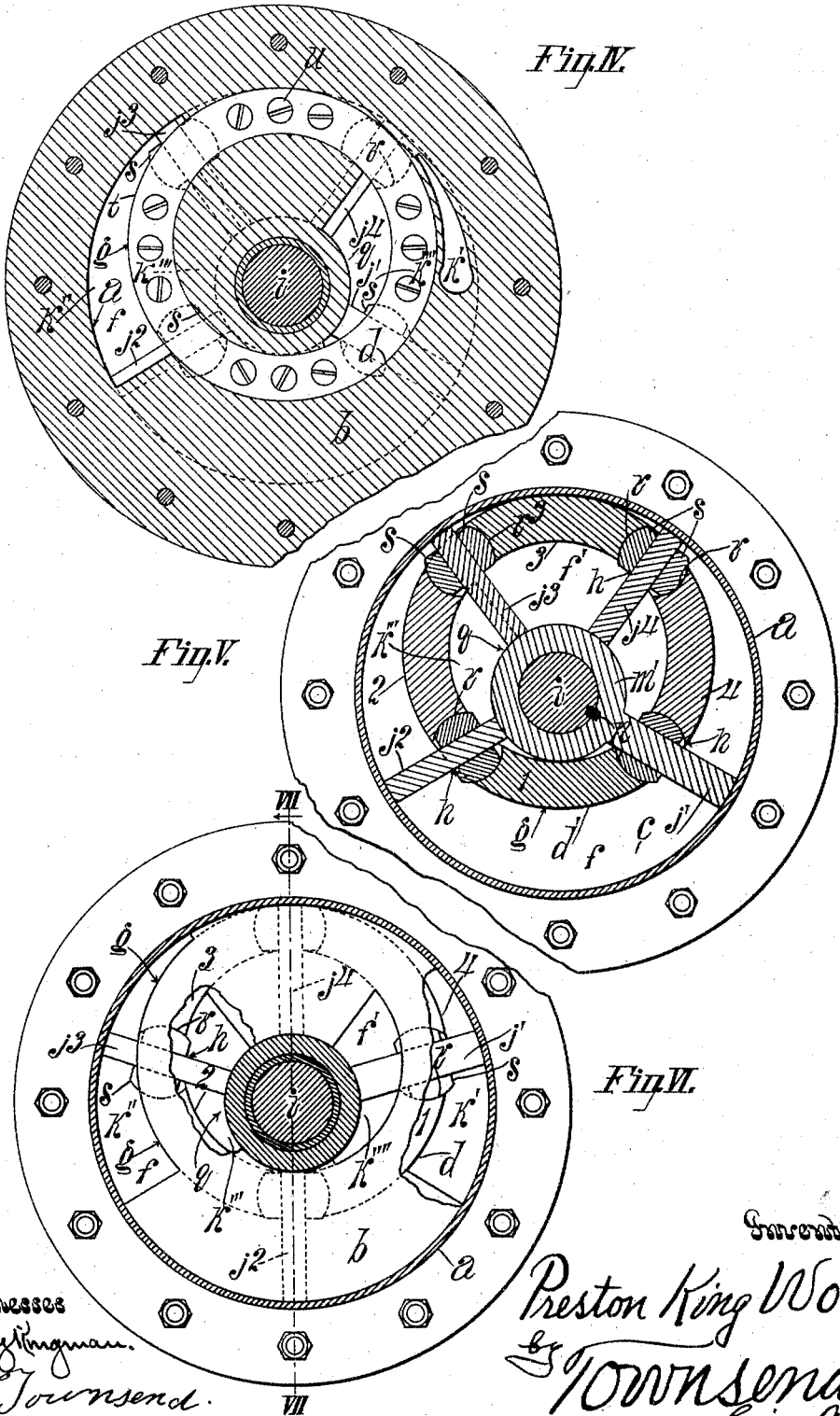

No. 767,028.

Patented August 9, 1904.

UNITED STATES PATENT OFFICE.

PRESTON KING WOOD, OF LOS ANGELES, CALIFORNIA.

MOTOR AND PUMP.

SPECIFICATION forming part of Letters Patent No. 767,028, dated August 9, 1904.

Application filed July 2, 1900. Serial No. 22,379. (No model.)

*To all whom it may concern:*

Be it known that I, PRESTON KING WOOD, a citizen of the United States, residing at Los Angeles, in the county of Los Angeles and State of California, have invented a new and useful Motor and Pump, of which the following is a specification.

My invention relates to a machine which may be used as a pump driven by power applied through a shaft and which may also be used as a pump driven by a fluid medium applied inside the machine and which may also be used as an engine for rotating the shaft, thereby to apply power to other machines.
This invention is an improvement upon an invention made by my son, Elmer Fred Wood, and which includes a stationary cylinder and a rotary cylinder arranged inside of the stationary cylinder and eccentric therewith and its outer wall tangent with the inner wall of the stationary-cylinder chamber, thus leaving a crescent-shaped space between the walls of the two cylinders, the rotary cylinder being provided with slots, piston-blades mounted on the shaft and extending through the slots in the rotary cylinder and arranged to fit the inside of the stationary cylinder and to revolve therein, means for introducing a propelling fluid into the space inclosed between a blade and the cylinder-walls at one point of the crescent, and means for exhausting said medium from between a following blade and the cylinder-wall at the other point of the crescent.
The purpose of my invention is primarily to provide a simple force rotary pump which will throw a steady uniform stream with a minimum amount of friction and which will be so compact and of such a character that it may be used at any depth in a bored well of sufficient diameter to admit it.

With this invention a pump of an inside diameter of six and one-half inches can be inserted into and operated in a well of seven inches inside diameter, and no foot-valve is required, the pump being constructed to avoid the necessity of such contrivances.

Another object of my invention is to provide a deep-well pump which combines in a simple compact machine a force-pump and a motor for driving the pump, said motor being adapted to be driven by steam, compressed air, water, or any available and suitable fluid medium.

Another object of my invention is to provide a very simple and compact machine which can be used interchangeably as a pump and as a motor. The machine can be variously constructed, and in practical operation either the shaft may be fixed and the outer cylinder made to turn or the outer cylinder fixed and the inner cylinder and shaft made to turn.

The accompanying drawings illustrate my invention as applied with a fixed outer cylinder and a rotating inner cylinder and shaft.

Figure I is a longitudinal section of my newly-invented motor and pump cutting through the outer and inner cylinders and running around the eyes of the piston-blades between two piston-blades, which are shown in position substantially equidistant from the middle of the outer crescent chamber. Irregular line I I' I$^2$, Fig. II, indicates the line of section. In this view the machine is arranged for use as an air-propelled motor and force-pump. Fig. II is a plan section on line II II, Fig. I. Parts are broken away to expose the interior construction. Fig. III is a fragmental sectional detail on line III III, Fig. II. Fig. IV is a plan section on line IV IV, Fig. I. Fig. V is a plan section on line V V, Fig I. Fig. VI is a plan section on line VI VI, Fig. VII, showing the position of parts at a different period of the revolution. In this view the machine is shown arranged for transmitting power through the shaft to or from the blades. Fig. VII is a longitudinal section on line VII VII, Fig. VI. In the machine shown in Figs. VI and VII the inlet-ports are both at the lower end. Fig. VIII is a fragmental sectional perspective view of the machine as shown in Figs. VI and VII. In these three views the machine is arranged to be used as a pump driven by the shaft or as a motor for driving said shaft.

*a* indicates a hollow outer cylinder furnished with heads *b c*, each of which is furnished with a circular seat, preferably in the form of an annular groove, said seats *d d'* being coaxial with each other and eccentric of the hollow outer cylinder and internally tangent to the wall of said hollow cylinder at one side thereof, thus leaving a crescent-shaped space between the groove and the wall of the cylinder.

$g$ indicates a hollow inner cylinder having its ends fitted in said grooves and being internally tangent to the wall of the outer cylinder and forming, in conjunction with the inside face of the wall of the outer cylinder, a crescent-shaped chamber $f$, and being furnished at intervals with slots $h$, extending through its walls from one head to the other of the outer cylinder. $i$ indicates a shaft journaled to rotate in the heads of the outer cylinder and extending through both cylinders coaxially of the outer cylinder. Piston-blades $j$, one for each of said slots in the inner cylinder, are mounted upon said shaft to revolve in the outer cylinder and extending through the slots in the inner cylinder and fitting the inside of the outer cylinder, said outer cylinder being provided with end ports $k$ at the points of the crescent-shaped chamber—that is to say, the ports are in the cylinder end or head as distinguished from the side of the cylinder. It is immaterial at which end of the cylinder the ports may be applied; but it is essential that they be at the end and not at the side of the cylinder and that one port be applied for one horn of the crescent-shaped chamber and another port be applied for the other horn of the crescent-shaped chamber. The blades $j$ are all mounted upon the shaft $i$ and are respectively joined to cylindrical-shaped members $m$, which together form a cylinder coaxial of the shaft $i$ and internally tangent to the wall of the hollow inner cylinder. The members $m$ are formed with eyes to fit the shaft. Said shaft is inserted through all of the eyes and is free to rotate in any except the eyes for one of said blades. The eye $m'$ of the blade $j'$ is fastened to the shaft $i$ by means of a key $n$, so that when the blade $j'$ revolves within the outer cylinder the shaft $i$ must rotate therewith. Since the blade $j'$ extends through a slot in the inner hollow cylinder $g$, the said cylinder $g$ is forced to rotate with the revolutions of the piston-blade $j'$, and since the other piston-blades extend through their respective slots in the inner rotary cylinder such blades are carried around by the inner rotary cylinder.

In the form shown in Fig. I a pipe $o$ is shown through which to introduce an impelling fluid. In the case of a combined motor and pump it is preferred to use compressed air for driving the motor, and the inlet-port for said compressed air may be either at the upper or lower end of the outer cylinder; but it is preferred to place such inlet-port at the upper end of the outer cylinder, as shown in the drawings, for the sake of convenience and compactness. The water-inlet port will be in the bottom head of the inner cylinder and the outlet-port will be in the top head of the inner cylinder. The port through which the air is injected into the outer crescent-shaped chamber $f$ will be extended in a groove rearward from the pipe $o$ to the extreme point of the chamber, as indicated in the drawings, so that the impelling fluid enters behind the piston-blade as soon as such blade has begun to enter the outer crescent-shaped chamber, thus avoiding back pressure as much as possible upon such blade. The air or other impelling fluid will drive the blade which has passed beyond the inlet-port until said blade has passed the outlet-port, through which the impelling fluid will exhaust. It is preferred to use air as an impelling medium, for the reason that the air passing up through the pump stock or pipe $p$ will assist in carrying the water up through such pipe.

The hollow cylindrical members or eyes $m$ and $m'$ of the several blades are held in line by the shaft, which passes through them, and they form a cylinder $q$ inside of the inner cylinder $g$. The cylinder $q$ surrounds the shaft and is eccentric to the cylinder $g$ and internally tangent thereto and forms in conjunction with the inner walls of the cylinder $g$ a crescent-shaped chamber $f'$.

The ports $k$ are distinguished from each other in the drawings by indices. An inlet-port opening into the outer crescent chamber is indicated by $k'$.

$k''$ indicates the outlet-port opening from the outer crescent chamber, $k'''$ an inlet-port opening into the inner crescent chamber, and $k''''$ an outlet-port leading from the inner crescent chamber.

For convenience of description the piston-blades $j$ are distinguished by indices 1 2 3 4, and the cylindrical members $m$ of the respective piston-blades are distinguished by like indices 1 2 3 4. Each of the piston-blades is preferably provided with two cylindrical members.

$m'$ indicates the cylindrical members for the piston-blade $j'$, which is keyed to the shaft $i$. These cylindrical members or eyes $m'$ are desirably attached at such different points along the shaft so as to give an efficient rotary driving connection to both ends of the piston-blade $j'$ and enable said blade without undue strain to act as a driver for the other blades which are swung or pivotally connected on the shaft.

For convenience of construction the inner hollow cylinder $g$ is built up of a number of pieces.

1 2 3 4 indicate segmental staves furnished at their edges, respectively, with channels $r$, into which are fitted segmental bearing-bars $s$, which are arranged in pairs and are segments of a hollow cylinder to fit in the grooves of the segmental staves to form the sides of the slots $h$, in which the blades $j$ are to work.

$t$ $t'$ indicate two rings which respectively form the upper and the lower ends of the inner cylinder $g$. These rings are respectively fastened to the upper and lower ends of the segmental staves 1 2 3 4 by screws $u$. The bearing-bars $s$ are arranged in pairs to form the opposite sides of the slots $h$ respectively and the blades $j$ respectively fit between the bars of the several pairs and slide freely therebetween. The body of the inner hollow cylinder $g$ is thus constituted of the staves 1 2 3 4, the bars $s$, and the end rings $t\ t'$, the spaces between the bars $s$ of each pair of said bars being closed by the piston-blades $j$.

In Figs. VII and VIII, $i''$ indicates a detachable extension of the shaft $i$. This shaft may be made to transmit power to or from the piston-blades, as occasion may require. $v$ indicates a conduit-pipe below the lower head $c$, and $p$ indicates a conduit-pipe leading up from the top head $b$. If it is desired to use the machine as a motor solely in the form shown in Figs. VII and VIII, in which the inlet-ports are both at the bottom and the outlet-ports both at the top, steam or air or any other suitable impelling fluid may be applied through the pipe $v$, thus entering the lower ports $k'$ and $k'''$. The air or other fluid which enters at the port $k'$ will pass into the crescent chamber $f$ and will act upon the rear face of the outermost portion of the blade, which has just passed the inlet-port, and will force said blade around in the direction of the arrows. The air which enters at $k'''$ will pass into the inner chamber $f'$ and will act upon the rear face of the innermost portion of the blade, which has just passed the inlet-port $k'''$, and will force said blade around in the direction of the arrow. The blades are thus made to rotate the inner cylinder and the shaft $i$. The fluid inclosed within the chambers $f$ and $f'$ in front of any of the blades $j$ will be forced to escape through the outlet-ports $k''\ k''''$, which in case of a motor are the exhaust-ports of the engine.

It is to be understod that either the shaft or the outer cylinder will rotate, depending on which of these members is held stationary. In case the outer cylinder is held stationary the shaft will rotate. If the shaft is held stationary, the outer cylinder will rotate, and in such case the outer cylinder might be used as a pulley to drive a belt.

In case the machine is to be used as a pump, with power applied through the shaft $i$, the outer cylinder will be stationary. By rotating the shaft the piston-blades $j$ are made to revolve within the two chambers $f\ f'$, and as they pass over the inlet-ports they tend to produce a vacuum which will be filled by the fluid to be pumped. In case of a pump inserted in a bored well the water will flow into the inlet-ports between the blades and will be forced out of the outlet-ports in a constant stream.

Where the machine is intended to be used as a motor and pump combined, the air or other impelling fluid may be applied to either the outer or the inner crescent chamber. If applied at the outer crescent chamber, as indicated in the drawings, the air has a superior leverage to lift the water. This arrangement is preferable for deep lifts; but where a high air-pressure may be employed and the lift is not great it may be found best to apply the air to the inner crescent chamber instead of to the outer crescent chamber.

It is to be understood that the impelling fluid may be applied at either point of either chamber and that the direction of rotation will depend upon the point of the crescent chamber into which the impelling fluid is introduced. It is also to be understood that the operation of the piston-blades in one chamber is not dependent upon their operation in the other chamber, except that where both chambers are used the inlet for one chamber must be on the side of the shaft opposite the inlet for the other chamber. The inlet to either chamber may be closed without affecting the action of the machine with relation to the other chamber.

In the drawings I have shown a hanging step depending from the lower piston-head $c$ for supporting the shaft $i$.

5 indicates the step-collar, depending from the head $c$ and furnished with a bushing 6, which fits the shaft $i$.

7 indicates the foot of the step, which consists in a plate fastened by screws 8 to the lower end of the collar 5.

9 indicates a lignum-vitæ block resting on the foot 7 and furnished with an upwardly-extending hemispherical boss 10 to fit in a hollow 11 in the lower end of the shaft.

12 indicates a passage extending up through the plate 7 and block 9 to admit water into the joint between the block 9 and the shaft $i$.

When the blades revolve around the axis of the shaft, they are forced to assume different positions relative to each other. This is permitted by fixing only one of the piston-blades to the shaft, the others being swung thereon by means of the eyes $m$.

The slot-bearing bars $s$ are fastened to the rings $t\ t'$ by the hollowed seats or grooves $r$, in which they are held by the piston-blades, respectively.

It is thus seen that I provide improved means for pumping from deep wells of small diameter, this end being mainly attained by confining all the ports to the space longitudinally in line with the pump-chambers.

What I claim, and desire to secure by Letters Patent of the United States, is—

1. The combination of an outer hollow cylinder furnished with heads, each of which is furnished on its inner face with an annular seat eccentric said cylinder and tangent with one side of the inner wall of said cylinder; a shaft journaled in the heads coaxially of said cylinder; a ring in one of said annular seats; a ring in the other of said annular seats; segments of a hollow cylinder extending between the rings and connected to the rings to rotate therewith, and spaced to form slots extending between the rings and cylinder-heads, said segments forming, together with the inner walls of the outer cylinder, a crescent-shaped chamber; piston-blades, one for each of said slots mounted upon said shaft and sliding through the slots respectively in the inner cylinder and fitting the inside of the outer cylinder, one of said blades being fixed to the shaft and others swung on said shaft; an inlet-port being provided through one of the heads and opening into one of the points of the crescent chamber; and an outlet-port being provided through one of the heads and opening from the other point of the crescent chamber.

2. A motor and pump comprising a hollow stationary cylinder furnished with heads; a hollow rotary cylinder inside of and eccentric with said stationary cylinder and tangent with the inside wall of said stationary cylinder and journaled to revolve in said stationary cylinder and furnished with longitudinal slots; a shaft journaled in the heads of the stationary cylinder and extending through the stationary and rotary cylinders coaxial with the stationary cylinder; piston-blades, one for each of said slots, and mounted on said shaft and sliding through the slots, respectively, in the rotary cylinder, and fitting the inside of the stationary cylinder, one of said piston-blades being fixed to the shaft and the others swung on said shaft, said blades being furnished with eyes through which said shaft passes and which form a cylinder inside the inner hollow cylinder and tangent with the inner wall thereof, thus forming a crescent-shaped chamber arranged opposite the crescent-shaped chamber between the stationary and the rotary cylinder; means for introducing a fluid through cylinder-head into one horn of one of the crescent-shaped chambers; means for discharge of fluid through cylinder-head from the other horn of said crescent-shaped chamber; means for admitting fluid through cylinder-head into one of the horns of the other crescent-shaped chamber; and means for discharge of fluid through cylinder-head from the other horn of said other crescent-shaped chamber, all of said means being confined within space longitudinally in line with said chambers.

3. The combination of an outer hollow cylinder furnished with heads, each of which is furnished on its inner face with an annular seat eccentric said cylinder and tangent with one side of the inner wall of said cylinder; a shaft journaled in the heads coaxially of said cylinder; a ring in one of said annular seats; a ring in the other of said annular seats; segments of a hollow cylinder extending between the rings and connected to the rings to rotate therewith, and spaced to form slots extending between the rings and cylinder-heads, said segments forming, together with the inner walls of the outer cylinder, a crescent-shaped chamber; and piston-blades, one for each of said slots mounted upon said shaft and sliding through the slots respectively in the inner cylinder and fitting the inside of the outer cylinder; suitable inlets and outlets being provided for said cylinders.

4. A motor and pump comprising a hollow stationary cylinder furnished with heads; a hollow rotary cylinder inside of and eccentric with said stationary cylinder and tangent with the inside wall of said stationary cylinder and journaled to revolve in said stationary cylinder and furnished with longitudinal slots; a shaft journaled in the heads of the stationary cylinder and extending through the stationary and rotary cylinders coaxial with the stationary cylinder; piston-blades, one for each of said slots, and mounted on said shaft and sliding through the slots, respectively, in the rotary cylinder, and fitting the inside of the stationary cylinder, a cylinder surrounding the shaft, and forming a third cylinder, inside the aforementioned inner cylinder and tangent with the inner wall thereof, thus forming a crescent-shaped chamber arranged opposite the crescent-shaped chamber between the stationary and the rotary cylinders, means for introducing a fluid through cylinder-head into one horn of one of each of the crescent-shaped chambers, and means for discharge of fluid through cylinder-head from the other horns of said crescent-shaped chambers.

In testimony whereof I have signed my name to this specification, in the presence of two subscribing witnesses, at Los Angeles, California, this 23d day of April, 1900.

PRESTON KING WOOD.

Witnesses:
 JAMES R. TOWNSEND,
 FRANCIS M. TOWNSEND.